Figure 1:
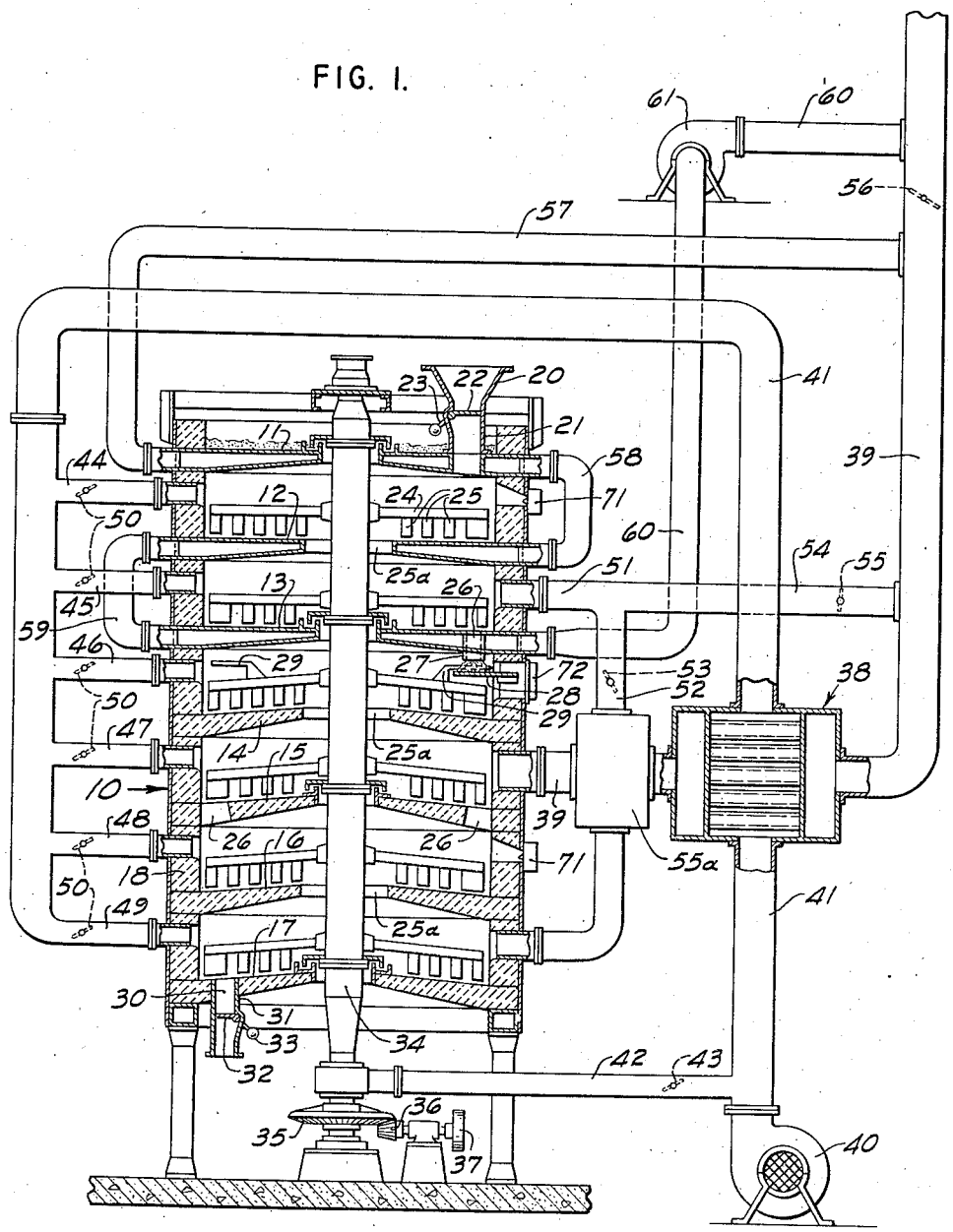

Jan. 24, 1939.  G. R. LEWERS  2,145,090
INCINERATION
Filed Nov. 17, 1936  3 Sheets-Sheet 1

INVENTOR
GEORGE R. LEWERS
BY
his ATTORNEY

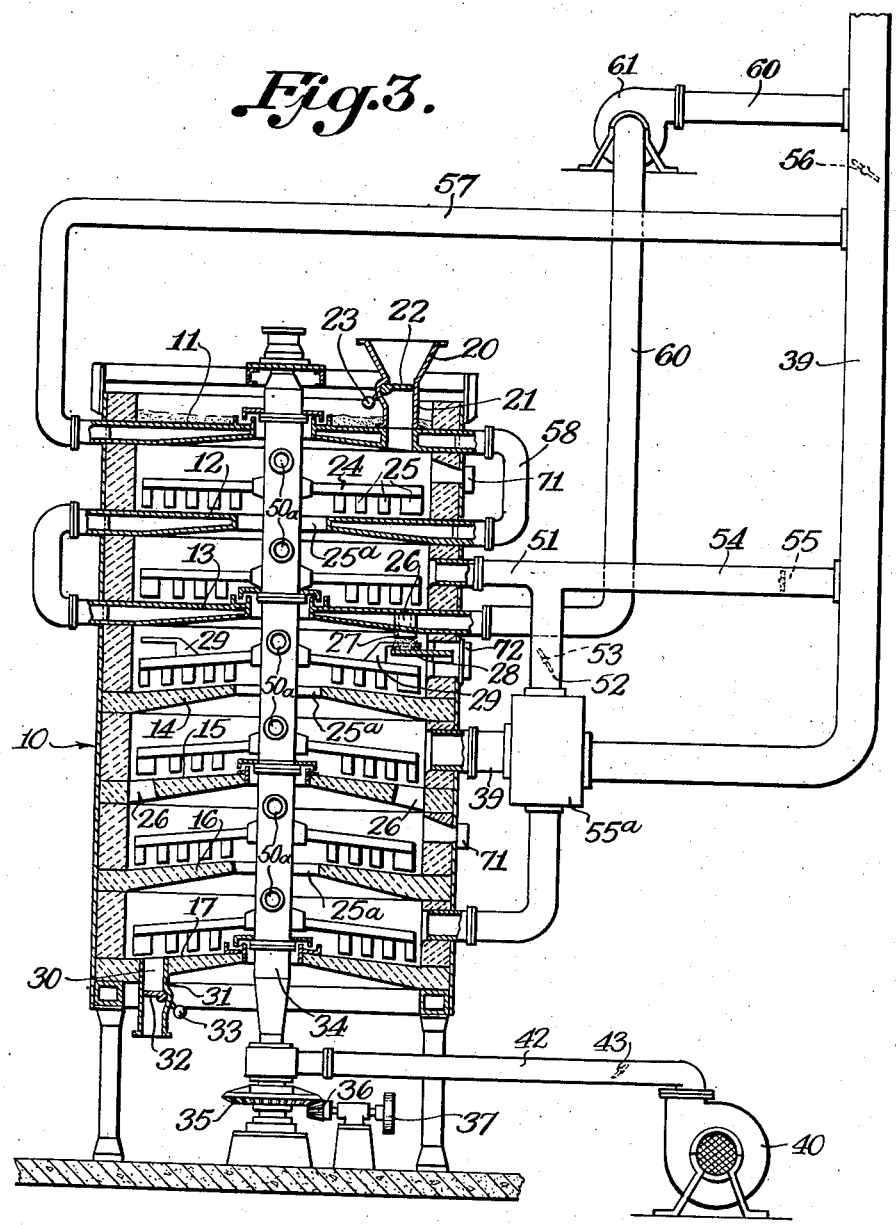

Patented Jan. 24, 1939

2,145,090

UNITED STATES PATENT OFFICE 2,145,090

INCINERATION

George R. Lewers, Brooklyn, N. Y., assignor, by mesne assignments, to Underpinning & Foundation Company, Inc., New York, N. Y., a corporation of New York Application November 17, 1936, Serial No. 111,194

13 Claims. (Cl. 110—12)

The present invention relates to treatment of material involving preliminary or drying stages in which moisture and volatile constituents are driven off, as by subjecting material to heating and contact with a stream of air, preferably preheated, and final stages in which the dried material and the gases and vapors from the drying stage are burned substantially completely thus eliminating noxious odors.

While applicable to the treatment of various materials, the present invention is particularly adapted for the disposal and destruction of waste materials such as garbage and sewage solids in the form of sludge or screenings having high moisture content.

The principal objects of the invention are to provide novel, advantageous and efficient forms of apparatus and processes for effecting treatment of the kind specified. Another object relates to improved control of the supply of air at all of said stages. A further object relates to the improved use of hot combustion gases in heat exchange relationship with the air and material under treatment in the drying stages.

In carrying out the invention, particularly as applied to the disposal of sewage solids, use may be made of a tiered multiple-hearth furnace comprising vertically spaced hearths with outlets at the center of one and the periphery of the next lower and vice versa, and rabbling means comprising a vertical shaft and rabbling devices extending therefrom over the hearths and arranged so as to work the material to the outlets of the hearths with which the rabbling devices are associated.

In order to obtain better control of the drying and burning operations, the furnace may be divided by an intermediate hearth into an upper drying section and a lower burning section. Obviously the dividing hearth must be provided at its outlet with means adapted to pass the solid material but to prevent the flow of gases. By such division of the furnace into sections, it is made possible to dry the material at suitable temperatures for reducing the moisture content to a desired extent, thereby tending to eliminate as much as possible fluctuation of temperatures in the lower burning section. The preliminary or drying section renders feasible the introduction of wet materials directly into the furnace without interfering with the operation of the furnace at its highest efficiency.

It should be understood that each of the sections may include either one or a plurality of hearths and corresponding compartments or zones above the hearths.

Heretofore in connection with the drying and burning furnaces of the character under consideration, it has been proposed to supply to the drying section, in any suitable volume to render the drying operation effective, air preheated at a point outside the furnace. The heat introduced into the drying section by the preheated air may be insufficient to evaporate moisture and drive off the volatile constituents of the material to be dried. To assure the introduction of a suitable amount of heat into the drying section, one or all of the hearths in the drying section and also the top of the furnace may be in the form of hollow drying hearths or trays made of material which is an efficient conductor of heat such as steel, cast iron or other suitable material. Each of the hollow trays may be in the form of an annular hollow chamber and if desired certain walls of the chamber may be provided with radiating fins.

The hot gases from the incinerating or burning section may be passed through a heat exchanger and then all or part of them may be passed through the hollow trays and thence to the stack. Preferably the hot gases of combustion are introduced into the uppermost of the hollow trays, constituting the top of the furnace and then are passed in succession, or in series, through one or more drying trays and then discharged from the furnace as by passage to a stack.

The heat exchanger through which the hot combustion gases are discharged is utilized to preheat fresh air which may be supplied in regulated amounts to all of the compartments in the drying and burning zones. The gases and vapors from the drying zone may be passed into the burning section, or part may be discharged into the stack flue by regulation of suitable dampers.

Figure 2:
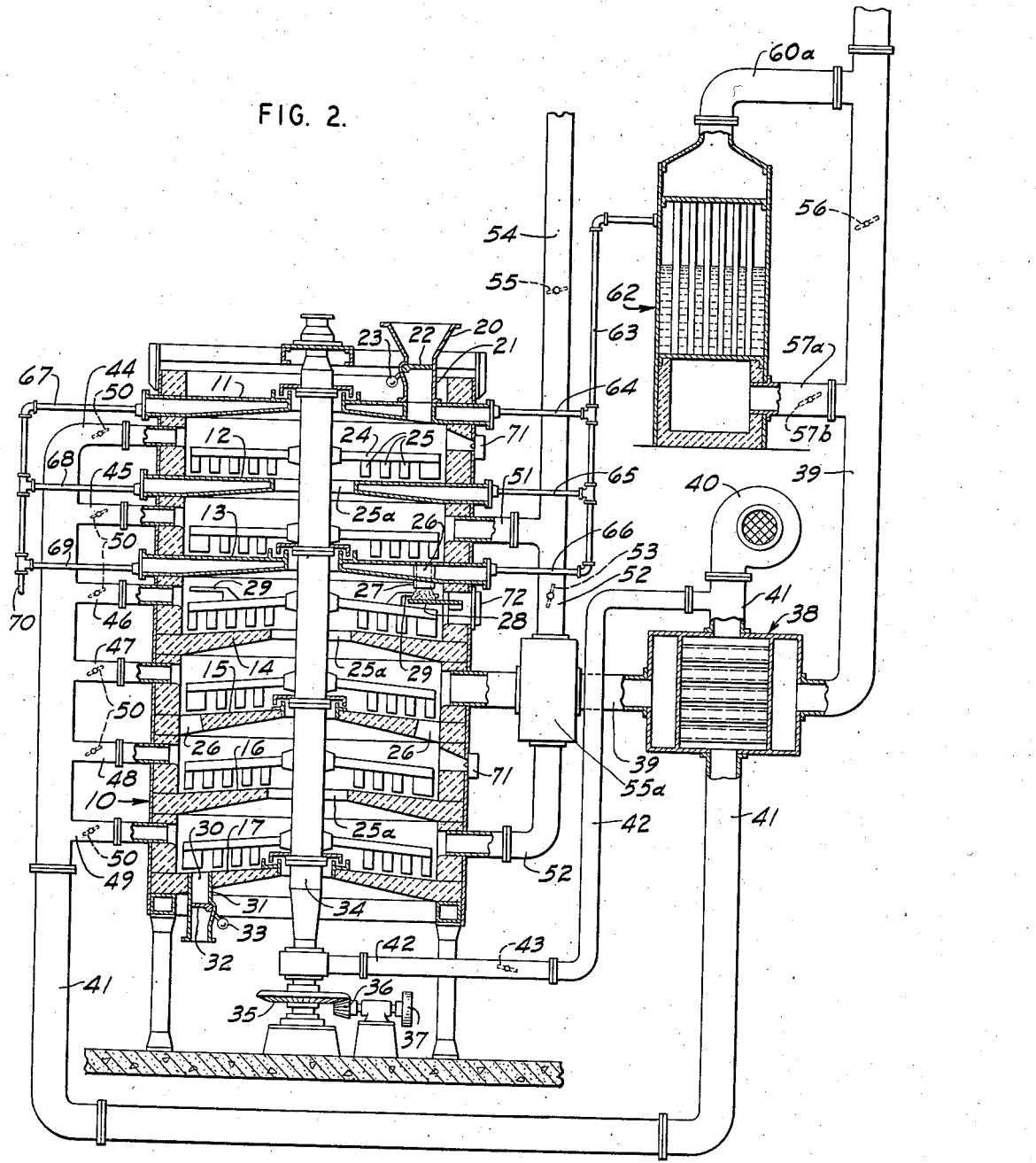

Other objects, features and advantages will appear upon consideration of the following description and of the drawings in which:

Fig. 1 is a view in vertical section of apparatus embodying a preferred form of the invention; and Fig. 2 is a view similar to Fig. 1 but with modified means for heating the contents of the drying section; and Fig. 3 is a view similar to Fig. 1 but with different means for preheating air and introducing it into the furnace.

As illustrated in Fig. 1, the invention may be embodied in a tiered multiple-hearth furnace 10 having a top 11, hearths 12, 13, 14, 15, 16 and 17 and a peripheral wall 18 by which the top and the hearths, including the lowermost hearth or bottom 17 are supported. The material to be treated, which may include solids with a substantial water content and containing volatile material, may be introduced into the furnace and deposited upon the uppermost hearth 12 through a hopper 20, and a chute 21 extending through the top 11 of the furnace and provided with a pivoted door or gate 22 urged to closed position by means of a weighted arm 23. As soon as a sufficient amount of material to overcome the weight of the arm 23 collects on the door or gate 22, the door swings downwardly about its pivotal support and the material on the door falls to the hearth 12.

As illustrated, the material introduced through the chute 21 falls on the hearth 12 near the peripheral wall 18 and is worked inwardly on the hearth by suitable rabbling means including a radial arm 24 and inclined blades 25 carried thereby and arranged to work material toward the central outlet 25a. From the hearth 12 the material drops to the central portion of the hearth 13 where it may be worked outwardly to an outlet 26 by means of rabbling devices similar to those used at the hearth 12 but with the blades 25 inclined so as to work the material outwardly to the discharge outlet 26.

This hearth 13 is used to divide the furnace into the upper drying section and a lower burning section. Preferably there is only the one outlet 26 and this is provided with a gas seal which may be of the sweep type and comprise a tube 27 extending downwardly from the hearth 13 to a level slightly above that of a fixed platform 28 on which the material passing through the outlet 26 and tube 27 piles up and maintains the tube 27 closed. The feeding of the material downwardly through the tube 27 may be effected by the action of one or more sweeps 29 mounted on one or more arms 24 of rabbling devices, these sweeps being so arranged that they will pass between the tube 27 and the platform 28 and sweep off material of which the place will be taken by additional material settling through the tube 27.

Below the hearth 13 the material is rabbled inwardly on hearth 14 to a central opening or outlet 25a through which it falls to the hearth 15, is rabbled outwardly on the hearth 15 until it falls through the outlets 26 to the hearth 16 where it is again rabbled for discharge through a central outlet 25a. The material then falls on the lowermost hearth 17 constituting the bottom of the furnace and is rabbled outwardly to an outlet 30 provided with a chute 31 normally closed by a gate or door 32 urged to closing position by weighted arm 33.

All of the rabbling devices may be driven by a hollow vertical shaft 34 positioned substantially at the vertical axis of the furnace. The shaft 34 may be driven by any suitable means such as a bevel gear 35 mounted thereon, a bevel gear 36 meshing with the bevel gear 35 and a pulley 37 connected with the bevel gear 36 and driven from any suitable source of power.

The air supplied to the interior of the furnace may be preheated by means of a heat exchanger 38 interposed in a duct 39 through which hot gases of combustion are discharge from the burning section of the furnace, as here shown, from the next to uppermost compartment of the burning section. The air to be preheated by the heat exchanger 38 is supplied by means of a fan 40 and a duct 41 directing the air through the heat receiving portion of the heat exchanger 38. Part of the air supplied by means of the fan 40 may be conducted by means of a branch duct 42 to the hollow shaft 34 for cooling and other purposes, the flow of air through the duct 42 being controlled by means of a damper 43 therein.

According to the present invention the preheated air supplied through the dust 41 may be supplied to all of the compartments of the burning section as well as all of the compartments of the drying section. To this end the duct 41 may be connected with the various compartments beginning with the uppermost compartment by ducts 44, 45, 46, 47, 48 and 49, respectively, each duct being provided with a controlling damper 50. The preheated air, gases and vapors from the drying section may be discharged from the lowermost compartment thereof through a duct 51 connected by a branch 52 with the lowermost compartment of the burning section, the flow through the duct 52 being controlled by a damper 53 therein. Instead of passing the air and gases from the drying section to the lowermost compartment of the burning section some or all of the air and gases may be passed through another branch 54, provided with a damper 55, to the duct 39 at the discharge side of the heat exchanger 38. With this arrangement the air and gases discharged from the drying section may be passed entirely to the burning section, entirely to the discharge duct 39 or part through the duct 52 and the remainder through the duct 54. Preferably the air and gases passing from the drying section to the burning section through the duct 52 are heated and their temperature raised by passing them through the heat-receiving portion of a heat exchanger 55a interposed in the hot exhaust gas duct 39 between the furnace 10 and the heat exchanger 38.

Instead of discharging the hot gases from the duct 39, part or all of these gases may be diverted by means of a damper 56 into a duct 57 to heat the hearths 11, 12 and 13 which are disclosed as hollow and formed of suitable heat conducting material such as cast iron or steel. The hot gases from the duct 57 are passed into the hollow top or tray 11 of the furnace and from this hollow top through a duct 58 to the hollow hearth 12 and from the hearth 12 through a duct 59 to the hollow hearth 13 from which the hot gases, at greatly reduced temperature, are passed through a duct 60 and a suction fan 61 to the discharge duct 39 at the discharge side of the damper 56.

In using the apparatus illustrated in Fig. 1, the desired amounts of preheated air may be supplied to the different compartments of the furnace as required and the air, gases and vapors discharged from the drying section may be passed into the discharge duct 39 or passed to the burning section as desired. For example, when there are no noxious odors carried by the air and gases from the drying zone, it may be desirable to pass the air and gases directly to the discharge duct 39 for otherwise the air and gases, at much lower temperature than that at which they entered the drying section, would enter the burning section thus tending to chill the latter. Obviously the only times when it would be necessary to pass air and gases from the drying zone to the burning zone would be those at which the air and gases are laden with noxious odors. Although the air and gases discharged from the drying zone are likely to be at a temperature much below that of the preheated air entering the drying section, this fall of temperature may be reduced or prevented by passing the hot gases of combustion through the hollow trays 11, 12 and 13 of the drying section, the amount of hot gases passing through these hearths being controlled by the damper 56. By withdrawing the hot gases of combustion from the compartment below the hearth 14, the temperature in the next compartment above is not so high and the hollow hearth 13 is not subjected to such high temperatures.

Referring to Fig. 2 of the drawings, the apparatus disclosed therein is in general the same as that disclosed in Fig. 1 but instead of utilizing hot gases of combustion from the discharge duct 39, to heat the hollow hearths or trays 11, 12 and 13, this heating may be effected by means of steam generated in a waste heat boiler 62 heated by hot gases diverted thereto through a duct 57a leading from the discharge duct 39 and controlled by a damper 57b, the amount of hot gases diverted being dependent also upon the closing of the damper 56 in the duct 39. From the waste heat boiler, the gases of combustion may be returned to the discharge duct 39 through a duct 60a. The steam generated in the waste heat boiler 62 may be conducted by means of a steam line 63 to the hearths 11, 12 and 13 through branches 64, 65, 66 respectively, drainage of condensation liquid being effected through branches 67, 68 and 69 respectively leading to a drainage line 70. In this form of apparatus it will be seen that the air and gases from the drying section which are not passed to the burning section, may be introduced into the line 39 beyond the duct 60a leading from a waste heat boiler.

One advantage of the use of steam is that the heating of the hollow trays 11, 12 and 13 may be kept more uniform than with the use of the hot gases of combustion as in the apparatus of Fig. 1.

In order to assist in starting the furnace and to maintain sufficiently high temperatures, each compartment of the furnace may be supplied with a burner 71, access to the interior of the various compartments being provided by doors 72.

According to another embodiment illustrated in Fig. 3, the heat exchanger 38, the duct 41 and the branch ducts 44 through 49 of Fig. 1 are omitted and the air may be supplied to the interior of the furnace through hollow shaft 34 and suitable openings 50a to various compartments of the furnace. It should be understood that it may be unnecessary to supply air to all compartments of the furnace and that either the number of openings or nozzles 50a may be reduced or some of them may be closed. The flow of gases through the hollow hearths may be controlled by use of the damper 56. With this arrangement the heat exchanger 55a is of particular value in preventing or reducing chilling of the burning section by the admission of air and gases from the drying section at too low a temperature.

It should be understood that various changes may be made and that certain features may be used without others without departing from the true scope and spirit of the invention.

Having thus described my invention, I claim:

1. The combination with a tiered multiple hearth furnace divided into a drying section and a burning section by a hearth with a gas seal, of means for discharging hot combustion gases from the burning section, means for discharging gases from the drying section, means for conducting gases discharged from the drying section to the burning section, means for conducting gases discharged from the drying section into heat exchanging relationship with discharge hot combustion gases, and means for varying the proportions of gases discharged from the drying section to the burning section and into heat exchange relationship with the discharged hot combustion gases.

2. The combination with a tiered multiple hearth furnace divided into a drying section and a burning section by a hearth with a gas seal, of means for discharging hot combustion gases from the burning section, means for conducting gases from the drying section to the burning section, means for discharging from the furnace, gases in the drying section, and means for varying the proportions of gases conducted from the drying section to the burning section and of gases discharged from the drying section.

3. The combination with a tiered multiple-hearth furnace divided by a hearth with a gas seal into a burning section and a drying section having a hollow hearth, of means for discharging hot combustion gases from the burning section, means for discharging gases from the drying section, means for conducting gases discharged from the drying section to the burning section, means for conducting hot combustion gases discharged from the burning section through said hollow hearth, and means for varying the flow of hot combustion gases through said hollow hearth.

4. The combination with a tiered multiple-hearth furnace divided into a drying section and a burning section by a hearth with a gas seal, a discharge duct through which hot gases of combustion are discharged from the burning section, a gas outlet for said drying section, a duct connecting said gas outlet with the interior of the burning section, a duct connecting the gas outlet with the hot-gas-discharge duct, and means for controlling the proportions of air and gas from said gas outlet of the drying section passing through the corresponding ducts to the burning section or to the hot-gas-discharge duct.

5. The combination with a tiered multiple-hearth furnace divided into a drying section and a burning section by a hearth with a gas seal, the drying section having a hollow top and a hollow hearth setting off a compartment in the furnace, of means for supplying air to the furnace, a discharge duct through which hot gases of combustion are discharged from the burning section, a heat exchanger in the hot-gas-discharge duct to preheat the air supplied to the furnace, a gas outlet for said drying section, a duct connecting said gas outlet with the interior of the burning section, a duct connecting the gas outlet with the hot-gas-discharge duct at the discharge side of said heat exchanger, means for controlling the proportions of air and gas from said gas outlet of the drying section passing through the corresponding ducts to the burning section or to the hot-gas-discharge duct, and means for passing hot gases of combustion through said hollow top and hollow hearth.

6. The combination with a tiered multiple-hearth furnace divided by a hearth having a gas seal into a burning section and a drying section having a plurality of hollow trays spaced vertically to provide compartments therebetween, of means for supplying air to the furnace, a discharge duct through which hot gases of combustion are discharged from the burning section, a gas outlet for said drying section, a duct connecting said gas outlet with the interior of the burning section, a duct connected to the hot-gas-discharge duct and to the hollow trays, a damper in the hot-gas-discharge duct at the discharge side of the duct conducting hot gases to the hollow trays and serving to divert the hot gases to the hollow hearths, and a duct receiving gases from the hollow trays and returning them to the hot-gas-discharge duct beyond said damper.

7. The combination with a tiered multiple-hearth furnace divided into a lower burning section and an upper drying section having a hollow top and a hollow hearth with a gas seal separting it from the burning section, of means for supplying air to the furnace, a discharge duct through which hot gases of combustion are discharged from the burning section, means for conducting gases from said drying section to said burning section, means including a duct connected to said hot-gas-discharge duct to pass hot gases through said hollow top and hollow hearth in series, a duct returning said hot gases from the hollow top and hollow hearth to said hot gas discharge duct, and a damper in the hot-gas-discharge duct between the connections to the supply and return ducts to determine the flow of hot gases through the hollow top and hollow hearth.

8. The combination with a tiered multiple-hearth furnace divided by a hollow hearth with a gas seal into a burning section and a drying section having a hollow top and an intermediate hollow hearth, of means for supplying air to the furnace including an air supply duct and branches with dampers leading to compartments between adjacent hearths, a discharge duct through which hot gases of combustion are discharged from the burning section, a heat exchanger in the hot-gas-discharge duct for preheating air flowing through the air supply duct, a duct passing gases from the drying section to the interior of the burning section, and means for passing variable amounts of hot combustion gases through said hollow top and hollow hearth.

9. The combination with a tiered multiple-hearth furnace divided by a hollow hearth into a lower burning section and an upper drying section having a hollow top and an intermediate hollow hearth, of means for supplying air to the interior of the furnace, means for passing gases from the drying section to the burning section, means for discharging hot gases of combustion from the burning zone, a waste heat boiler connected to said hollow top and hollow hearths to heat the same, and means for supplying variable amounts of hot combustion gases to said boiler to generate steam therein to different degrees of super-heat as required.

10. The method of incineration which comprises passing material of high moisture content downwardly through a plurality of zones while first drying and then burning the same, temporarily retaining said material in each of a plurality of said zones, moving said material substantially horizontally through each of said zones by the application of a series of rabbling impulses thereto, preventing the direct passage of gases between two adjacent zones, thereby separating the zones into a drying group and a burning group, supplying variable amounts of air to the various zones of the drying and burning groups over the material therein, discharging air and vapors from the drying group and introducing them into the burning group, and passing variable amounts of the gaseous products of combustion from the burning group above, below and between the drying zones in heat exchanging relationship with the air and vapors therein.

11. The method of incineration which comprises passing material of high moisture content downwardly through a plurality of zones while first drying and then burning the same, temporarily retaining said material in each of a plurality of said zones, moving said material substantially horizontally through each of said zones by the application of a series of rabbling impulses thereto, preventing the direct passage of gases between two adjacent zones thereby separating the zones with a drying group and a burning group, supplying air as required to zones of the drying and burning groups, discharging air and vapor from the drying group and introducing them into the burning group, utilizing variable amounts of the gaseous products of combustion from the burning group to generate steam, and supplying said steam between the drying zones in heat exchanging relationship with the air and vapors therein but separated therefrom.

12. The combination with a tiered multiple-hearth furnace divided by a hearth with a gas seal into a burning section and a drying section having a hollow hearth, and including rabbling means having a vertical shaft, of means for supplying air to the furnace through said shaft, of means for discharging hot combustion gases from the burning section, means for discharging gases from the drying section, means for conducting gases discharged from the drying section to the burning section, means for conducting hot combustion gases discharged from the burning section through said hollow hearth, and means for varying the flow of hot combustion gases through said hollow hearth.

13. The combination with a tiered multiple-hearth furnace divided by a hearth with a gas seal into a burning section and a drying section having hollow hearths, of means for heating the hollow hearths by supplying them with hot fluid containing heat of combustion from said burning section, means for preheating air and supplying it to the compartments or spaces between the hollow hearths, and means for passing variable amounts of air laden with vapors from said drying section to the burning section.

GEORGE R. LEWERS.